United States Patent [19]

Jorgenson

[11] 4,159,912
[45] Jul. 3, 1979

[54] ACOUSTICAL FLOOR PREPARATION AND METHOD

[75] Inventor: Ronald M. Jorgenson, Minneapolis, Minn.

[73] Assignee: Acoustical Floors, Inc., Hamel, Minn.

[21] Appl. No.: 775,738

[22] Filed: Mar. 9, 1977

[51] Int. Cl.$^2$ .............................................. C04B 11/00
[52] U.S. Cl. ...................................... 106/109; 106/110
[58] Field of Search ................................ 106/109, 110

[56] References Cited

U.S. PATENT DOCUMENTS

| 499,170 | 6/1893 | Bronsen | 106/109 |
|---|---|---|---|
| 3,179,528 | 4/1965 | Holmgren et al. | 106/109 |
| 3,623,898 | 11/1971 | Limberis | 106/109 |
| 3,972,723 | 8/1976 | Balle et al. | 106/109 |
| 4,075,374 | 2/1978 | Jorgenson et al. | 106/90 |

*Primary Examiner*—L. Dewayne Rutledge
*Assistant Examiner*—John P. Sheehan
*Attorney, Agent, or Firm*—James R. Haller

[57] ABSTRACT

A fluid, self-leveling, sand-containing flooring preparation, and a method for its production and use. The flooring preparation includes 10 parts by weight of a calcium sulfate hemihydrate-rich composition, from 13 to about 30 parts by weight of sand, and sufficient water in the range of about 5 to about 8.5 parts by weight to provide the slurry, when mixed violently, with a runny, fluid, self-leveling consistency. When poured onto an appropriate substrate, the slurry hardens or cures with minimum expansion into a hard flooring layer having a smooth level upper surface and having sand distributed substantially uniformly through its thickness.

6 Claims, 5 Drawing Figures

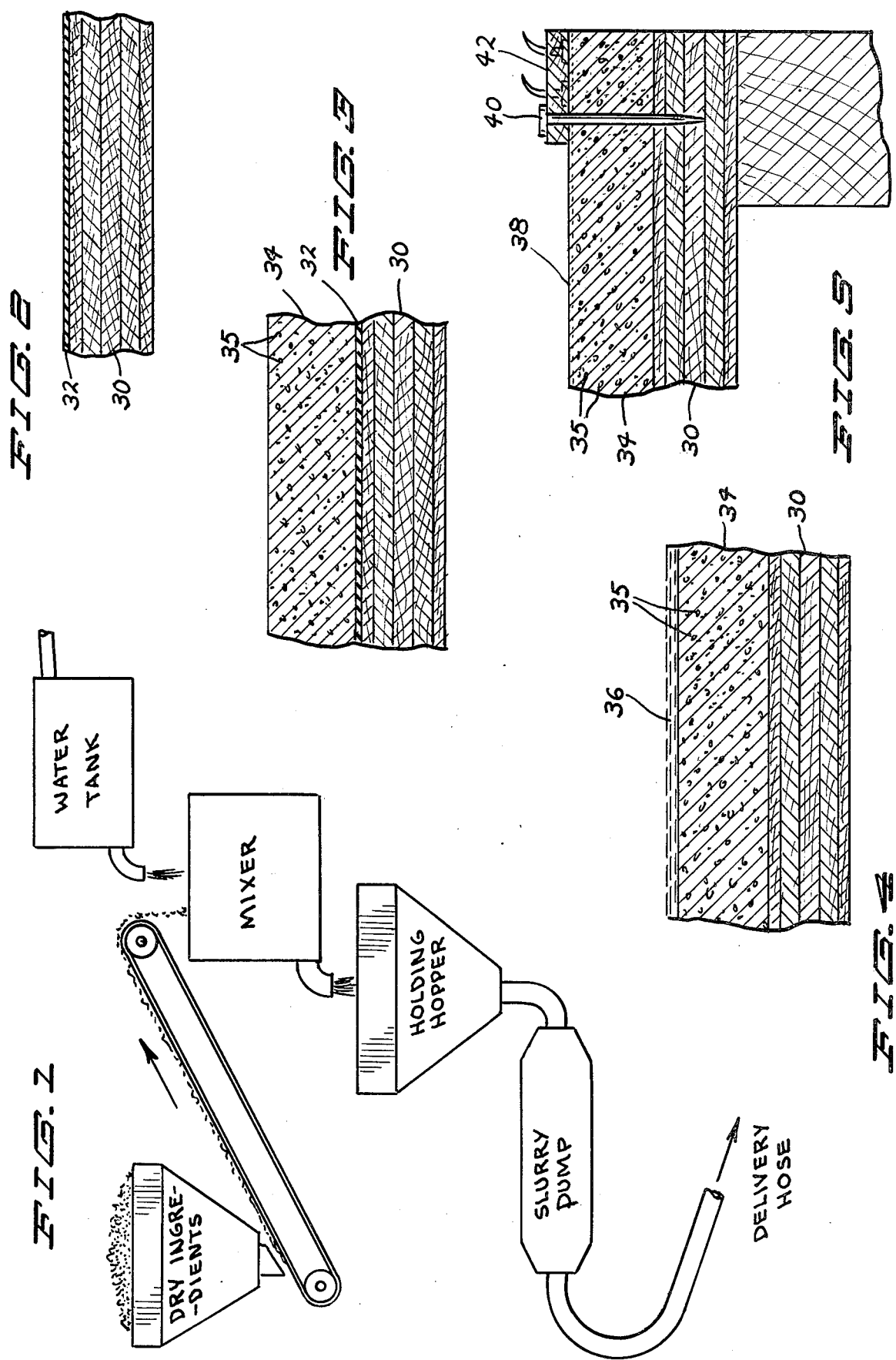

ACOUSTICAL FLOOR PREPARATION AND METHOD

BACKGROUND OF THE INVENTION

Problems with noise transmission from one floor to another within apartment buildings or other multi-tenant buildings are often quite severe. Good building design dictates that the floors and walls of individual units in the building be reasonably soundproof. Particularly, the floors of such building units should resist the transmission not only of airborne sounds such as music or speech, but also impact-produced sounds from walking, dancing and the like.

Sound insulating flooring which previously has been employed is generally either difficult to install, yields poor sound insulating qualities, or is expensive. In one instance, for example, floors have been prepared from a mixture of Portland cement and sand, the mixture being troweled on a suitable substrate and finished to provide a smooth surface. Shrinkage effects during setting of this floor can result in floor cracks, and the troweling and finishing procedure is time consuming and hence expensive. Another instance involves the use of preformed sheets of particle board or of gypsum-type Sheetrock. Again, the installation procedure is time consuming, and a considerable wastage of material results.

In commonly owned Jorgenson, et al U.S. Pat. No. 4,075,374 issued Feb. 21, 1978, a flooring composition was described as comprising a slurry which included pressure-calcined calcium sulfate hemihydrate, sand, a polymeric latex, an antifoam agent, and sufficient water to provide the slurry with a water-like consistency. This flooring preparation has given good results over a period of years; problems, however, have been encountered in regulating the setting or curing time of the preparation. Further, the sand which is employed in that preparation tends to settle slowly during the curing stage, resulting in a flooring which is quite rich in sand at its lower surface and which is quite poor in sand and rich in latex at its upper surface. Perhaps because of expansion effects during the curing cycle, a number of floors which have been poured using this preparation have tended to crack or chip during subsequent construction activities, thereby requiring workmen to return to the job site to correct the problem. Depending upon the particular economics of each situation, the requirement of having workmen return to the job site can transform a profit making venture into a financial loss, notwithstanding the fact that acoustic floors can be more economically produced in accordance with the invention set out in said U.S. Pat. No. 4,075,374 than by any method prior thereto.

It would be highly desirable to provide a watery, runny flooring preparation which, during the curing cycle, would exhibit minimum expansion and substantially no settling of the sand therein, and which would permit a floor to be prepared in a manner requiring no return visits by workman to repair defects.

SUMMARY OF THE INVENTION

The invention relates to a hardenable slurry for pouring an acoustic floor, the slurry being self-leveling and, when poured into thin (e.g., ¾ in.) sections, hardening or curing with minimal expansion into a hard flooring layer having a smooth, level upper surface and having sand distributed substantially uniformly through its thickness.

The slurry of the invention includes 10 parts by weight of a composition rich in calcium sulfate hemihydrate 13 to 30 parts by weight of sand, and sufficient water in the range of about 5 to about 8.5 parts by weight to provide the slurry, when mixed violently, with a runny, fluid, self-leveling consistency. The calcium sulfate hemihydrate composition employed in the instant invention is capable, when violently mixed with sand and water in the weight ratio of ½/0.68 and poured into a ¾ in. deep layer, of hardening within 20–60 minutes at 70° F. without significant settling of the sand. The calcium sulfate hemihydrate-rich composition desirably includes at least about 90% of calcium sulfate hemihydrate of which the majority is the reaction product of atmospheric calcined gypsum, and a minor amount of Portland cement, desirably in the range of from about 5% to about 8% by weight, sufficient to reduce the expansion of the slurry as the latter sets up or hardens. The consistency of the slurry of the instant invention is somewhat more watery then that of the slurry described in U.S. Pat. No. 4,075,374 and in addition does not require the addition of a latex or antifoam agent. The set up time (the time between violent mixing of the slurry and the time the slurry sets up into a solid mass) has been found to be very reproducible, and adjustments with respect to reducing or lengthening the set up time are rarely required. Considerable experience with this composition has shown that the composition produces an extremely excellent floor which is substantially free from defects and which has required substantially no return calls by workmen to repair the floor.

DESCRIPTION OF THE DRAWING

FIG. 1 is a schematic view of equipment which is employed for making and pumping the slurry of the invention;

FIGS. 2, 3 and 4 are broken away, cross-sectional views of a subfloor in successive stages of the preparation of the flooring of the invention; and FIG. 5 is a cross-sectional, broken away view of a floor of the invention in place upon a subfloor and to which has been affixed a carpet installation strip.

DETAILED DESCRIPTION

The present invention employs, in a violently mixed slurry form, a calcium sulfate hemihydrate composition, sand and water in particular quantities. The slurry is, on the one hand, extremely thin and watery so that when it is poured or pumped onto a suitable substrate, it will form a thin, watery layer which is self-leveling, but which on the other hand exhibits little expansion upon curing and causes the sand to remain in substantially uniform suspension throughout the curing cycle. The resulting flooring is hard, resistant to sound transmission, and substantially defect free.

As disclosed in commonly owned U.S. Pat. No. 4,075,374, a slurry including sand, water and a composition which is primarily pressure-calcined calcium sulfate hemihydrate can be employed to form a floor. It has been found, however, that such floors tend to expand considerably upon curing such that sections of the floor may actually break loose from the underlaying substrate, resulting in cracks or in small included air spaces which generate a hollow sound when the floor above the air space is struck. A polymeric latex was employed in the slurry to provide strength and a smooth upper surface, and an antifoam agent was similarly added to avoid foaming when the ingredients of the slurry were violently mixed together. During the curing cycle, significant heat was evolved and expansion of the flooring occurred, and also the sand particles within the slurry tended to settle, resulting in a floor having a sand-rich lower portion merging upwardly into a sand-poor upper region.

It has now been found that certain calcium sulfate hemihydrate compositions can be mixed with sand and water in given proportions to make a slurry which, when poured into floor, exhibits minimal expansion and substantially no settling of the sand particles. Yet, the consistency of the slurry is, if anything, more watery than the slurry of the above-mentioned application.

The calcium sulfate hemihydrate-rich composition which forms an ingredient of the slurry includes, as its major ingredients, calcium sulfate hemihydrate and Portland cement. The composition includes at least about 90% of calcium sulfate hemihydrate by weight, with the remainder of the composition being primarily Portland cement, the latter being present in exemplary concentrations of from about 5% to about 8% by weight. The function of the Portland cement is to contribute strength to the resulting floor, and to reduce expansion of the floor during cure. The majority of the calcium sulfate hemihydrate in the composition is desirably atmospheric calcined ("kettle stucco") material, which may undergo further processing by, for example, ball milling or the like, as will be more fully described below. If desired, a minor portion of the calcium sulfate hemihydrate may be pressure calcined material such as that described in U.S. Patent Application Ser. No. 600,461 (now U.S. Pat. No. 4,075,374), the teachings of which are incorporated herein by reference. The composition may in addition include dispersing agents, such as naphthelene sulfonate, and accelerators such as sodium citrate to modify the curing or set up time of the slurry. One such composition which has yielded excellent results in the present invention includes approximately 75.3% of atmospheric calcined calcium sulfate hemihydrate which has been physically altered by ball milling; approximately 19.1% of pressure-calcined calcium sulfate hemihydrate; approximately 5.5% of Type II Portland cement (ASTM Specification C150–61); and approximately 0.14% of sodium citrate. It is theorized that the physical alteration produced in the atmospheric calcined calcium sulfate hemihydrate crystals due to ball milling causes this material, when mixed in a given ratio with water, to exhibit an increased consistency or viscosity, and this may contribute to the ability of the composition to maintain sand in suspension during the curing cycle of the slurry. The pressure calcined calcium sulfate hemihydrate, on the other hand, exhibits a fairly low consistency or viscosity when mixed in a given ratio with water, and this material is believed to contribute to the very thin, watery consistency of the resulting slurry.

Another exemplary calcium sulfate hemihydrate composition includes approximately 92.2% by weight of the atmospheric calcined material ("kettle stucco"), 7.1% of Portland cement which has been heated to 500° F. to burn out impurities which might otherwise affect the setting time of the resulting slurry, and 0.8% of naphthelene sulfonate as a dispersing agent.

As referred to above, "consistency" and "viscosity" refer generally to the thickness, or resistance to flow, of a water-calcium sulfate hemihydrate mixture. The consistency of various types of calcium sulfate hemihydrate can vary widely, and is largely dependent upon the method by which the hemihydrate was prepared from mined gypsum. Consistency may be defined as the number of milliliters of water which is required to be mixed with 100 grams of a hemihydrate material to provide a mixture into which a particular weighted plunger will penetrate to a given distance. Reference is made particularly to American Society for Testing Materials Method ASTM C472–73, paragraph 5 entitled "Normal Consistency of Gypsum Plaster".

Candidate calcium sulfate hemihydrate-rich compositions can be tested for use in accordance with the present invention as follows: To a clean container are charged 100 grams of the hemihydrate and 63 ml. of water, all of the ingredients being at room temperature. The ingredients are beaten rapidly with a whisk type wire beater for four minutes to achieve thorough mixing, and the resulting slurry is poured into a small, flat-bottomed cup (a "dixie" cup) to an approximate thickness of $\frac{3}{4}$ in. Within sixty minutes at room temperature, the slurry layer should be sufficiently cured so that when the cup is turned on its side, no slumping or movement of the slurry is noticed. After an additional 24 hours at room temperature, the now-solidified patty is removed from the cup and is broken in half. The now exposed internal cross section of the patty is carefully visually examined. The sand particles should be uniformly distributed through the thickness of the patty, and the upper surface of the patty should include an extremely thin layer which is largely sand-free and which has a smooth, level upper surface.

The amount of sand which is employed with a given quantity of calcium sulfate hemihydrate-rich material of the invention can vary somewhat, depending at least partially upon the moisture content of the sand. The density of sand can vary generally between about 100 and about 120 lbs. per cubic foot, depending upon its water content. Desirably, the slurry of the invention includes approximately 13 to about 30 parts by weight of sand per 10 parts by weight of calcium sulfate hemihydrate-rich composition. The sand is believed to contribute to the resistance to sound transmission of the resulting floor, and additionally reduces expansion of the floor as it cures.

The amount of water which is employed in slurries of the invention can vary widely, but best results have been obtained when using from about 5 to about 8.5 parts by weight of water for each 10 parts by weight of the calcium sulfate hemihydrate-rich composition. The amount of water is dependent largely upon the quantity and water content of the sand, and care is taken to avoid adding too little or too much water. Too little water will produce a non-leveling slurry, whereas too much water will diminish the sand-suspending properties of the slurry.

The invention may be more easily understood by reference to the following non-limiting samples in which the calcium sulfate hemihydrate-rich composition is the above-described composition which includes 92.2 parts by weight of atmospheric calcined calcium sulfate hemihydrate, 7.1 parts by weight of heat-treated Portland cement, and 0.8 parts by weight of naphthelene sulfonate.

In each example, 100 lbs. of the dry calcium sulfate hemihydrate-rich composition was charged to a suitable container, together with a given volume of sand and water. The mixture was then rapidly and thoroughly mixed, and was then employed to actually pour a floor over a suitable substrate. In each example, the self-leveling slurry layer hardened within 20-60 minutes. Several days after the floors were poured, a return visit was paid to the floor site and small samples of flooring were removed and were examined for uniformity of the sand dispersed therethrough. The floors were also monitored for a period of several days to several weeks to determine their general acceptability with respect to cracking or the formation of air pockets between the flooring and the substrate. I then rated the acceptability of the floors on a general, over-all basis of acceptability with respect to cracking, self-leveling, air voids, surface smoothness, etc.) and assigned each floor a value on a scale from 1 to 10 in which a rating of 1 would indicate a floor which is generally unacceptable from a commercial standpoint, and 10 would indicate a floor which is defect-free and perfectly acceptable. Floors produced in accordance with co-owned U.S. Pat. No. 4,075,374, with which I am intimately familiar, would be rated at approximately 5 on this ascending scale. I also rated the floors with respect to sand dispersibility on a scale of 1-10. A rating of 1 would indicate that the sand settled severely. A rating of 10 would indicated that the sand was distributed quite uniformly through the floor thickness except, as noted, for the thin, smooth surface layer (e.g., the sand was substantially uniformly distributed through the floor thickness). Floors produced in accordance with U.S. Pat. No. 4,075,374 would be rated at about 3 on this scale.

The respective amounts of calcium sulfate hemihydrate-rich composition, sand and water, together with the resulting floor rating as indicated above, are set out in the following table:

| Ex. | lbs. of Hemihydrate-rich Composition | Gallons of Sand | Gallons of Water | Overall Rating 1-10 | Sand Distribution, 1-10 |
|---|---|---|---|---|---|
| 1 | 100 | 14 | 7½ | 10 | 10 |
| 2 | 100 | 18 | 7½ | 5 | 9 |
| 3 | 100 | 10 | 7½ | 7 | 5 |
| 4 | 100 | 14 | 10 | 1 | 1 |
| 5 | 100 | 14 | 6 | 3 | 7 |
| 6 | 100 | 18 | 6 | 2 | 6 |
| 7 | 100 | 18 | 9 | 7 | 7 |

It will be understood that the composition of Example 4 contained excess water which reduced the sand-suspending properties of the slurry. This situation can easily be remedied by adding more sand or hemihydrate composition. Similarly, the comparatively high viscosity slurries of Examples 5 and 6 could effectively be altered through the addition of more water.

As explained above, the slurry of the invention should have a "set up", or "cure" time of about 20-60 minutes at about 70° F. "Set up" time refers to the amount of time required for a watery slurry of the invention, after having been thoroughly mixed for about 4 minutes, to harden into a non-flowable mass. Hardening of the mass ordinarily occurs with concurrent formation of a thin layer of water on the surface, but the exothermic nature of the curing reaction ordinarily provides sufficient heat to evaporate this layer of water quickly. The set up time of the slurry depends to some extent upon the temperature and humidity conditions under which the floor is poured, high temperatures and low humidities favoring rapid curing. To avoid damage to walls within an apartment building or the like which might be caused by water seepage, it is desired that the water which is formed on the surface of the slurry during curing be evaporated as quickly as possible, and good ventilation of the area in which the slurry is poured is thus highly desirable.

With reference to FIG. 1 of the drawing, equipment for manufacturing and pumping the slurry of the invention is shown in diagramatic form generally as 10. The equipment includes a water tank 12, a mixer 14 below the water tank and having a top opening to admit water, a holding hopper 16 below the mixer and having an open top for receiving the mixed slurry, and a pump 18 for receiving the mixed slurry and pumping through a hose 18.1 into an apartment building or the like for pouring of a floor. Also shown is a belt conveyor 20 for conveying sand and the calcium sulfate hemihydrate-rich composition into the mixer 14, and also a hopper 22 for feeding the conveyor belt 20. For convenience, the water tank 12, mixer 14, holding hopper 16, pump 18 and a portion of the conveyor belt 20 are all enclosed within the body of a large truck, with means provided for also mounting the dry mixture hopper 22 to the truck so that the equipment as a whole can be readily transported from one job site to another. With the equipment thus depicted, the watery slurry of the invention may be manufactured in batches with the mixer 14. With the use of the holding hopper 16, the pump 18 receives a continuous flow of slurry, thus making the pouring operation essentially continuous although the mixing of the ingredients is a batch process. Water is supplied to the water tank 12 through a hose 12.1 which may be connected to a source of water at the job site. Quantities of sand and bags of the calcium sulfate hemihydrate-rich composition may be stacked on the ground or in appropriate containers immediately outside the truck body and near the hopper 22. One workman ordinarily is assigned to operate the thus-described equipment to control the mixing and pumping operation and to take slurry samples as desired; another workman periodically adds sand and the calcium sulfate hemihydrate-rich composition to the hopper 22, and the remaining workmen (ordinarily three or four in number) are stationed at the interior of the apartment complex or office building where the floor is to be poured. The hose 18.1 leading from the pump is ordinarily of heavy rubber having an inner diameter of 2 inches, and thus is capable of conveying the watery slurry to the pour site at fairly high volume flow rates.

Because of the heaviness of the hose 18.1, and because the hose must often be moved rapidly from one room to another within a building complex, two or three workman ordinarily man the hose with one of these workman directing the slurry issuing from the hose onto to the subfloor in an amount approximately equal to the amount necessary to form the poured floor with the desired thickness. When a large number of rooms in an apartment or office complex are to be poured in a single day, considerable preplanning is necessary so that the rooms and hallways may be consecutively poured and so that the workmen within the building may escape finally through an open door or window of the last room to be poured. When the watery slurry has been poured onto a significant area of the floor (e.g., 100-200 sq. ft.), a workman with high cleated boots may draw a leveling tool across the floor to insure that the proper level of slurry has been obtained. The leveling tool may take the form of a section of one inch by four inch lumber, with a straight edge having two or more nails or hooks or other spacers along its length, the spacers extending from the edge of the board for a distance equal to the thickness of the floor to be poured. When the board, with spacers pointed downwardly, is drawn across the floor, the spacers easily sink through the watery slurry and are dragged along the subfloor, the upper edge of the board distributing slurry as needed to insure that the floor will have uniform height. Little movement of the slurry in this manner is necessary when the thickness of the freshly poured slurry is closely estimated, the slurry being substantially self-leveling and tending to flow easily into the corners of a room, around posts, and the like. Although the surface of the floor may be "darbied" or "floated" using a redwood or other float as described in U.S. Pat. No. 4,075,374, the slurry of the instant invention makes this step largely unnecessary.

Depending upon the nature of the subflooring or underlayment, suitable subfloor preparation may be necessary or desirable before the slurry of the invention is poured. For example, it is desired that the floors poured from the slurry of the invention be adherent to the subfloor. It is also desired that the water in the slurry be prevented from penetrating to any significant extent into the subflooring itself since this would reduce the amount of water remaining to effect a good curing of the slurry. When the substrate is of new plywood, it is desirable to first wet the surface of the plywood with a latex such as that described under the tradename "Dow 460" latex in U.S. Pat. No. 4,075,374, the latex including a small amount of an antifoam material. The latex tends to seal the surface of the plywood and appears to increase adhesion between the plywood and the poured floor. A concrete plank subflooring is ordinarily quite porous and has a rough surface. To prevent water from the slurry from being rapidly wicked down into the concrete plank and thus giving rise to premature or incomplete curing, the concrete plank may be prepared by saturating it with water, the rough surface of the plank providing sufficient adhesion between it and the acoustical floor. In the event the subfloor is an old wood floor (ordinarily quite absorptive of water), it is desirable to prepare the floor by sealing with an asphalt emulsion such as that sold under the tradename SS-1 (Chevron Oil Company). The asphalt emulsion may be troweled onto the surface to fully seal the floor before the slurry of the invention is applied. Yet another commonly employed substrate is gypsum plank. The preparation of the gypsum plank surface is essentially the same as that for new plywood. The use of the latex or asphalt emulsion also tends to inhibit mold growth by preventing plywood or old wooden floors from becoming overly soaked with water when the slurry is poured thereon.

The following describes a typical mixing and pouring operation:

To the hopper 22 (FIG. 1) is charged 300 lbs. of the dry, calcium sulfate hemihydrate-rich composition and 42 gals. (approximately 5.6 cubic feet) of sand. About 22½ gals. of water are charged from the holding tank 12 into the mixer 14, and the operator starts the conveyor belt 20 to convey the sand-hemihydrate-rich composition to the mixer. The mixer, which is of the ribbon type, is set in motion as the dry materials are thus added, and additional water may be added to the resulting slurry as needed to obtain the desired very watery consistency. An accelerator may be added if necessary, but this is not often required. The mixing of the slurry is quite rapid, and is ordinarily finished within only a few minutes. The thoroughly mixed slurry is then dropped into the holding hopper 16 which conveys the slurry to the pump 18, and the mixing process is repeated so that the holding hopper is prevented from running empty. The slurry is pumped through the hose 18.1 into the building where the floor is to be poured, the residence time of the slurry in the hose being sufficiently short so that little change occurs in the consistency of the slurry. The slurry exits from the end of the hose onto the subfloor, as indicated above, and may be moved about slightly with a leveling tool if this is required. As the curing process proceeds (usually in 15–30 minutes or thereabouts after the pouring operation), the floor becomes warm and a very thin puddle of water forms on the surface of the floor, the heat of the curing floor tending to rapidly evaporate the water.

With reference to FIGS. 2–5 of the drawing, a plywood subfloor is designated generally as 30 and is provided with a seal coat of latex 32. The watery slurry of the invention (FIG. 3) is then poured onto the sealed subfloor to form a self-leveling, homogeneous layer 34, the sand particles 35 being uniformly distributed through the thickness of the floor. As curing of the slurry proceeds, a thin sheet or layer of water (36 in FIG. 4) forms on the surface of the slurry and is rapidly evaporated, as can best be understood from the fact that floors which are prepared in accordance with the invention are ordinarily dry and sufficiently hard to walk upon within an hour after the pouring operation.

FIG. 5 presents a cross section of a poured floor of the invention, and illustrates the substantially uniform distribution of sand through the thickness of the floor 34. The very top-most "skin" 38 of the floor is rich in the cured calcium sulfate hemihydrate, and presents a smooth, level upper surface. The flooring itself is hard and is resistant to chipping or scratching, even when nails 40 or the like are driven into the floor to anchor, for example, a "tackless" wooden carpet lath 42 to the edge of the floor. The floors of the invention exhibit good resistance to sound transmission and are pleasing to the eye. The minimal lateral expansion which occurs upon curing permits the floors to gently abut against the confining walls of a room, but is insufficient to cause the floor to bow or shatter under stress concentrations. The sand is distributed substantially uniformly through the thickness of the flooring, and this is believed to further strengthen the floor and reduce stresses and undue expansion. It has been found, in any event, that the floors of the invention exhibit little if any tendency to break or to develop air pockets, whereas previous floors, such as that described in U.S. Pat. No. 4,075,374 have required workmen to return to the job site for repairs on various occasions due to cracking, surface damage or air pocket formation.

Thus, manifestly, I have provided a slurry for the preparation of an acoustic floor which is watery and self-leveling, which maintains sand therein in substantially uniform suspension throughout its thickness when poured onto a substrate, and which expands only very slightly to thus avoid warping, buckling and cracking. Because of the very thin, watery consistency of the slurry of the invention, floors prepared from it are self-leveling and require little if any finishing.

While we have described a preferred embodiment of the present invention, it should be understood that various changes, adaptations, and modifications may be made therein without departing from the spirit of the invention and the scope of the appended claims.

What is claimed is:

1. A fluid, watery, self-leveling, sand-containing flooring preparation for pouring an acoustical floor curable with minimal expansion to form a hard, strong floor having sand substantially homgeneously distributed therethrough, the preparation comprising a well-mixed slurry containing
   a. 10 parts by weight of a composition including at least about 90% by weight of calcium sulfate hemihydrate and capable, when violently mixed with sand and water in the weight ratio of ½/0.68 and poured into a ¾ in. deep layer, of hardening within 20–60 minutes at 70° F. without significant settling of the sand;
   b. about 13 to about 30 parts by weight of sand; and
   c. sufficient water in the range of about 5 to about 8.5 parts by weight to provide the slurry, when mixed violently, with a runny, watery fluid, self-leveling consistency.

2. The floor preparation of claim 1 wherein said composition including at least about 90% by weight of calcium sulphate hemihydrate includes a minor amount by weight of Portland cement.

3. The floor preparation of claim 1 wherein at least the majority of the calcium sulfate hemihydrate is the reaction product of the atmospheric calcination of gypsum.

4. The flooring preparation of claim 3 wherein the majority of the calcium sulfate hemihydrate is the reaction product of atmospheric calcined gypsum, and a minor amount of the calcium sulfate hemihydrate is the reaction product of pressure calcined gypsum.

5. A fluid, self-leveling, sand-containing flooring preparation for pouring an acoustic floor curable with minimum expansion to form a hard, strong floor having sand substantially homogeneously distributed therethrough, the preparation comprising a well-mixed slurry containing
   a. 10 parts by weight of a composition consisting essentially of at least about 90% by weight of calcium sulfate hemihydrate, and Portland cement, and in which at least the majority of the calcium sulfate hemihydrate is the reaction product of the atmospheric calcination of gypsum, said composition being capable, when violently mixed with sand and water in the weight ratio of ½/0.68 and poured into a ¾ in. deep layer, of hardening within 20–60 minutes at 70° F. without significant settling of the sand;
   b. 13 to 30 parts by weight of sand; and
   c. sufficient water in the range of about 5 to about 8.5 parts by weight to provide the slurry, when mixed violently, with a runny, fluid, self-leveling consistency.

6. A fluid, watery, self-leveling, sand-containing flooring preparation for pouring an acoustical floor curable with minimum expansion to form a hard, strong floor having sand substantially homogeneously distributed therethrough, the preparation being in the form of a well-mixed slurry consisting essentially of
   a. ten parts by weight of a composition including at least about 90% by weight of calcium sulfate hemihydrate and capable, when violently mixed with sand and water in the weight ratio of ½/0.68 and poured into a ¾ inch deep layer, of hardening within 20–60 minutes at 70° F. without significant settling of the sand;
   b. about 13 to about 30 parts by weight of sand; and
   c. sufficient water in the range of about 5 to about 8.5 parts by weight to provide the slurry, when mixed violently, with a runny, watery, self-leveling consistency.

UNITED STATES PATENT AND TRADEMARK OFFICE
CERTIFICATE OF CORRECTION

PATENT NO. : 4,159,912

DATED : July 3, 1979

INVENTOR(S) : Ronald M. Jorgenson

It is certified that error appears in the above—identified patent and that said Letters Patent are hereby corrected as shown below:

In Column 2, line 11, in Column 9, line 13,
in Column 10, line 10, and in Column 10, line 29:

½/0.68 should read 1/2/0.68

Signed and Sealed this

Fourth Day of March 1980

[SEAL]

Attest:

SIDNEY A. DIAMOND

Attesting Officer

Commissioner of Patents and Trademarks